(12) United States Patent
Roberts (10) Patent No.: US 7,448,160 B2
(45) Date of Patent: Nov. 11, 2008

(54) MOSQUITO HARVEST TRAP

(76) Inventor: Donald R. Roberts, 8355 Colesville Rd., Silver Spring, MD (US) 20910

( * ) Notice: Subject to any disclaimer, the term of this patent is extended or adjusted under 35 U.S.C. 154(b) by 237 days.

(21) Appl. No.: 10/968,960

(22) Filed: Oct. 21, 2004

(65) Prior Publication Data

US 2006/0086037 A1    Apr. 27, 2006

(51) Int. Cl.
*A01M 1/02* (2006.01)
*A01M 1/10* (2006.01)
*A01M 1/12* (2006.01)

(52) U.S. Cl. ..................... 43/107; 43/132.1
(58) Field of Classification Search .............. 43/107, 43/111, 132.1, 131; 119/69.5; 4/321, 323, 4/317, 354, 665
See application file for complete search history.

(56) References Cited

U.S. PATENT DOCUMENTS

| | | | | |
|---|---|---|---|---|
| 1,156,872 A | * | 10/1915 | Atwood | 137/526 |
| 2,208,281 A | * | 7/1940 | Sharp et al. | 4/354 |
| 2,440,680 A | * | 5/1948 | Gerin | 210/110 |
| 2,451,144 A | * | 10/1948 | Aubrey | 210/110 |
| 3,579,651 A | * | 5/1971 | Russo | 4/317 |
| 3,594,825 A | * | 7/1971 | Reid | 4/323 |
| 3,696,786 A | * | 10/1972 | Garwood | 119/69.5 |
| 3,997,999 A | * | 12/1976 | Evans | 43/107 |
| 4,002,146 A | * | 1/1977 | Neff | 119/51.04 |
| 4,019,459 A | * | 4/1977 | Neff | 119/223 |
| 4,328,636 A | * | 5/1982 | Johnson | 43/107 |
| 4,630,569 A | * | 12/1986 | Dieleman | 119/69.5 |
| 5,123,201 A | * | 6/1992 | Reiter | 43/107 |
| 5,139,655 A | * | 8/1992 | Sigler | 210/532.1 |
| 5,743,212 A | * | 4/1998 | Forjohn | 119/69.5 |
| 5,784,998 A | * | 7/1998 | Manzer | 119/69.5 |
| 5,815,980 A | * | 10/1998 | Clarke, Jr. | 43/113 |
| 5,896,697 A | * | 4/1999 | Kang | 43/107 |
| 5,983,557 A | * | 11/1999 | Perich et al. | 43/107 |
| 6,023,884 A | * | 2/2000 | Yanohara | 43/132.1 |
| 6,063,295 A | * | 5/2000 | Williams | 210/134 |
| 6,112,453 A | * | 9/2000 | Clarke, Jr. | 43/113 |
| 6,234,197 B1 | * | 5/2001 | McKiernan et al. | 4/323 |
| 6,314,590 B1 | * | 11/2001 | Lee | 4/665 |
| 6,338,220 B1 | * | 1/2002 | Dicks | 43/132.1 |
| 6,618,984 B1 | * | 9/2003 | Li | 43/107 |
| 6,651,266 B1 | * | 11/2003 | Liu et al. | 4/323 |
| 6,665,979 B1 | * | 12/2003 | Hsu | 43/107 |
| 6,708,443 B2 | * | 3/2004 | Hall | 43/107 |
| 6,886,293 B2 | * | 5/2005 | Forehand | 43/107 |
| 6,990,768 B1 | * | 1/2006 | Boston | 43/132.1 |
| 7,073,287 B2 | * | 7/2006 | Lau | 43/107 |
| 7,134,238 B2 | * | 11/2006 | Forehand | 43/107 |
| 7,281,350 B2 | * | 10/2007 | Wilbanks | 43/107 |
| 2004/0094462 A1 | * | 5/2004 | Preisser et al. | 210/532.1 |
| 2005/0081428 A1 | * | 4/2005 | Ramsey et al. | 43/132.1 |

(Continued)

FOREIGN PATENT DOCUMENTS

AU    9511632 A   *   8/1995

(Continued)

*Primary Examiner*—Darren W Ark
(74) *Attorney, Agent, or Firm*—Baker & Hostetler LLP (57) ABSTRACT

A mosquito harvest trap which includes a control unit, a holding chamber and a water tank. The trap is based on water column technology being used to harvest and expel mosquito larvae residing within the water column.

13 Claims, 5 Drawing Sheets

U.S. PATENT DOCUMENTS

| | | | |
|---|---|---|---|
| 2005/0210735 A1* | 9/2005 | Harmer et al. | 43/107 |
| 2005/0274061 A1* | 12/2005 | Zhu | 43/107 |
| 2005/0279016 A1* | 12/2005 | Williams et al. | 43/107 |
| 2006/0090391 A1* | 5/2006 | Huang | 43/107 |
| 2006/0144769 A1* | 7/2006 | Okros | 210/123 |
| 2006/0150473 A1* | 7/2006 | Bette | 43/107 |
| 2006/0248782 A1* | 11/2006 | Dancy | 43/107 |
| 2007/0074447 A1* | 4/2007 | Kalogroulis | 43/107 |
| 2007/0174959 A1* | 8/2007 | Sanders et al. | 4/665 |
| 2007/0214711 A1* | 9/2007 | Mignot | 43/107 |

FOREIGN PATENT DOCUMENTS

| | | | |
|---|---|---|---|
| BR | 9901950 A | * | 1/2001 |
| BR | 200210313 A | * | 8/2004 |
| FR | 2897509 A1 | * | 8/2007 |
| GB | 2410668 A | * | 8/2005 |
| GB | 2418589 A | * | 4/2006 |
| JP | 10146145 A | * | 6/1998 |
| JP | 2003144031 A | * | 5/2003 |
| JP | 2005087199 A | * | 4/2005 |
| JP | 2006223276 A | * | 8/2006 |
| WO | WO 03007710 A1 | * | 1/2003 |
| WO | WO 2007/032745 A1 | * | 3/2007 |

* cited by examiner

MOSQUITO HARVEST TRAP

FIELD OF THE INVENTION

The present invention relates generally to traps for flying insects. More particularly, the present invention relates to a mosquito harvesting trap and disposal device.

BACKGROUND OF THE INVENTION

The device described is designed for mosquito control. Modern approaches to mosquito control include uses of chemicals (insecticides) to kill both adult and immature stages of mosquitoes. Chemicals are also used to repel mosquitoes (topical repellents) as they approach humans to bite e.g., OFF, etc.

Traps designed to capture adult mosquitoes (adult mosquito traps) have recently become popular with homeowners. This popularity is a result of growing problems of mosquitoes and mosquito-borne diseases in urban areas. These traps are specifically designed to attract adult female mosquitoes as they search for a warm-blooded host to bite.

Environmentalists have worked to stop uses of insecticides for mosquito control. In particular, environmentalist pressures have eliminated all modern options for use of the long-acting chemicals that in earlier years were used to reduce or eliminate many of the insect-borne diseases. Beyond the severe limitations imposed by environmentalist pressures, the chemicals themselves are only as effective as they are effectively used. Effective use is dependent on frequency of use, method of application, timing of applications, and characteristics of mosquitoes that are being targeted for control. In the hands of experts, the chemicals can be highly effective. In the hands of the typical homeowner, the use of chemicals is commonly ineffective and wasteful.

Topical repellents can protect an individual from mosquito bites. However, repellents are expensive, require frequent application to the skin, and are often unpleasant to the user. Based on their claims that the repellents harm or potentially harm children, special interest groups are working to stop use of topical repellents. Some people are actually allergic to the repellent chemicals. In spite of these problems, repellents are useful for individual protection against mosquito bites.

Adult mosquito traps are designed to attract the generic female mosquito. The problem with traps for control of mosquitoes relate to a trap's inability to competitively attract each type of mosquito that might be biting in the backyard of the typical urban homeowner. There are only a few species of mosquitoes that are common in backyards and even fewer that tend to bite humans. Unfortunately, modern traps do not specifically attract and capture the more important mosquitoes. Additionally, traps are expensive to buy, expensive to maintain, and commonly characterized by homeowners as ineffective.

A major problem of mosquitoes in backyards relates to the numbers of human-biting mosquitoes that are present. In some cases, traps might capture large numbers of mosquitoes but have little influence on numbers biting humans. Indeed, great numbers of mosquitoes might be collected in traps without successfully reducing the numbers biting humans and laying eggs for the next generation. As a consequence large numbers of mosquitoes might be produced in the local environment to continually replenish numbers captured in traps. Moreover, the trap may not competitively capture mosquitoes that move into a backyard in response to the attractant emitted by a trap. Under such circumstances, the trap might actually increase the number of mosquitoes in the homeowner's backyard and result in more bites.

Trap brochures typically declare that use of adult mosquito traps should be only one of several approaches to mosquito control. Often the manufacturer recommends that homeowners also practice habitat reduction, also referred to as "source reduction," to control mosquitoes. Mosquitoes are produced in large and small bodies of water in and around houses. Source reduction methods are almost always directed at reducing (emptying/draining) the bodies of standing water in backyards and adjoining sites. The goal of source reduction is to reduce chances that mosquitoes will have water for laying eggs and producing the next generation of biting mosquitoes.

Until now, an alternative to source reduction has not been technologically feasible. One alternative approach is to attract mosquitoes to an optimal site for laying eggs, allow the mosquito to lay her eggs, then harvest and destroy the immature stages after the eggs hatch. The technology for an alternative or supplement to source reduction is the subject of the present invention.

Mosquitoes require water for eggs to hatch and for the immature stages to undergo growth and development. Each different mosquito species will make use of its own preferred type of water. Growth stages of mosquitoes are aquatic and are called "larvae" (plural) or "larva" (singular).

Source reduction by homeowners consists of emptying water from all containers in yards as well as routinely cleaning gutters and surface drainage to eliminate bodies of standing water. Source reduction has been promoted as a means of mosquito control for decades. Source reduction has also been proposed as an approach to disease control. Decades of efforts have shown that this approach to mosquito control is dependent on a high level of user compliance (the homeowner must exert great and continuous effort). Basically, source reduction has proven to be highly ineffective.

The device described below addresses the need for an alternative or supplement to source reduction. The device incorporates new technologies for selectively capturing the mosquito's progeny and a mechanism for destroying the progeny without the use of chemicals. Additionally, the device can be equipped with mosquito species-specific attractants. Using species-specific attractants, the device can be highly effective against mosquitoes that pose the greatest threats to humans. Described is an enabling technology that can be used in traps to continuously trap mosquito larvae produced in birdbaths, can be used in traps for tree hole breeding mosquitoes, can be used to trap species responsible for the West Nile Virus transmission to birds and/or humans, can be used to trap and destroy the Asian Tiger mosquito that poses great problems in backyards in many urban areas, or can be used in floating traps designed for use in backyard garden ponds. Each trap will require specific design characteristics; but the underlying technology will be the same.

For perspective, much research has focused on defining specific attractants for egg-laying female mosquitoes. Although we can produce water that will stimulate gravid females of important species of mosquitoes to visit and lay eggs, we have no specific and efficient means of killing these mosquitoes once attracted to the water body. In particular, we have no means of continuous, low-maintenance capturing and killing of mosquitoes. Attempts have been made to attract mosquitoes to traps treated with toxic chemicals. However, toxic chemicals can result in an unhealthy body of water and the chemicals often repel or irritate mosquitoes and drive them away before the females lay eggs. Oviposition traps have been developed that prevent the females from exiting once they enter to lay eggs. Such traps have special entry portals that are, in one way or another, constricted to prevent exiting. Constricting entry portals also serve to discourage females from entering in the first place, so they function at low levels of efficiency. Another approach is to attract mosquitoes to water equipped with a vacuum device that will aspirate female mosquitoes. Thus, there is a need for continuous operation of the aspirator and its relatively high energy requirements are clear obstacles to routine use of this type of trap.

The water column technology is an enabling technology. For the first time, this technology enables use of research that has identified many new attractants for gravid mosquitoes. In this context, water treatments can be targeted to attract different species of mosquitoes. For example, decomposing hay material or small packets of rabbit food can be used to produce water that is highly attractive to the mosquitoes that are largely responsible for transmitting West Nile Virus to birds and to humans. Specific attractants have now been developed for attracting gravid females of *Aedes aegypti* mosquitoes. These mosquitoes are responsible for transmitting dengue viruses to humans in urban environments. Such attractants are, in some cases, species-specific. Thus, the attractants could be used in combination with water column technology to lure important species to the water, stimulate them to lay eggs, and then collect and destroy their progeny. This technology offers an alternative or supplement to source reduction which has proven ineffective in controlling mosquito and disease problems.

The functional elements of the device, take advantage of basic behaviors of mosquito larvae. Important aspects of mosquito larval behavior are as follows: 1) most mosquito larvae must come to the water surface to breath; 2) mosquito larvae are highly mobile within the confines of their water body and move or swim by switching the rear section of their long worm-shaped bodies back and forth; 3) when disturbed, larvae dive to the bottom of the water body; 4) most larvae actually dive to the bottom to feed; but must return to the surface to breathe; 5) larvae that encounter a sloped surface while swimming to the bottom will move down along the sloped surface to reach the bottom; and 6) larvae that encounter a sloped surface while moving to the surface will move upward along the sloped surface to reach the water surface.

Accordingly, it is desirable to provide a method and apparatus that harvests and disposes of these mosquito larvae. The device described below can operate on solar energy and battery power. The device requires energy; but its energy requirements are low and occur in short infrequent intervals.

SUMMARY OF THE INVENTION

The foregoing needs are met, to a great extent, by the present invention, wherein in one aspect an apparatus is provided that in some embodiments provides a trap for harvesting mosquito larvae, comprising a water tank; a holding chamber; and a control unit, wherein the water tank is disposed beneath the holding chamber and the control unit is configured to expel and to reestablish a predetermined level of water within the holding chamber.

In accordance with one aspect of the present invention, a method of trapping mosquitoes, comprising the steps of attracting mosquitoes to lay eggs; collecting mosquito larvae; and flushing mosquito larvae collected.

In accordance with another aspect of the present invention provides a trap for harvesting mosquito larvae, comprising means for attracting mosquitoes to lay eggs; means for collecting mosquito larvae; and means for flushing mosquito larvae collected.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
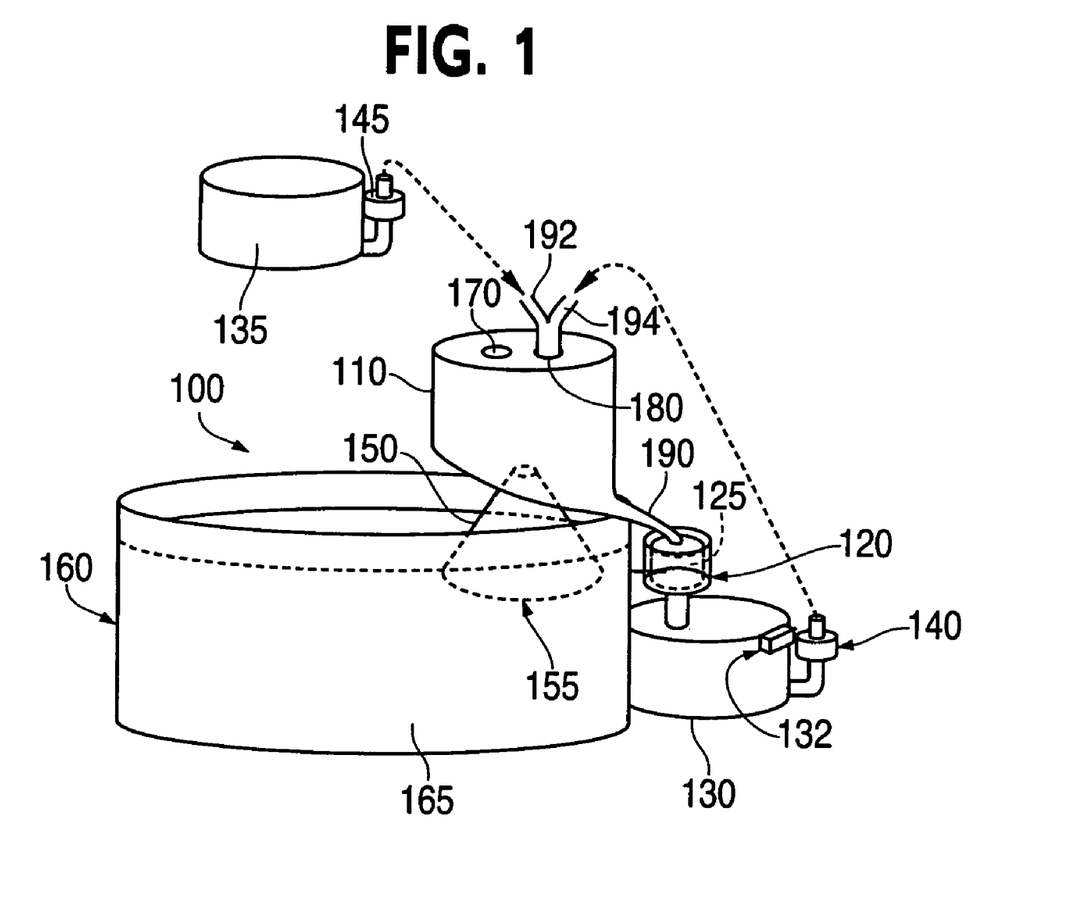
FIG. 1 is a perspective side view illustrating a mosquito harvest trap according to a preferred embodiment of the invention.

The invention will now be described with reference to the drawing figures, in which like reference numerals refer to like parts throughout. Referring to FIG. 1, an embodiment in accordance with the present invention provides a mosquito harvest trap 100 having a control unit 200, a holding chamber 110 and a water tank 160. The trap 100 is based on water column technology. This technology has become a practical option for mosquito control because of advances in printed circuitry and programmed chips for controlling and sequencing functions of multiple components in a device. The plan of the mosquito harvest trap 100 also utilizes a solar rechargeable battery 240 using solar panels 250, as well as water pump 140, air pump 410 and float switch 220.

The present invention includes an embodiment of the present inventive apparatus and method is illustrated in FIG. 1. An inverted, preferably, transparent plastic funnel 150 may be welded at one end into the bottom of a sealed, transparent plastic holding chamber 110 while having a mouth opening 155 at the opposing end. A holding chamber 110 of transparent plastic. The chamber 110 is a short, round cylinder. Cylinder diameter is at least equal to diameter of the widest part of inverted funnel 150. A large plastic water tank 160 holds the water body 165 where female mosquitoes can lay eggs. The water body 165 has a water surface area much larger than area covered by the inverted funnel 150.

Referring to FIG. 1, the trap 100 includes a harvest chamber 120. This harvest chamber 120 has a small removable screened chamber 125 covered with a fine mesh screen. Water from the holding chamber 110 flows through the harvest chamber 120 and larvae are strained onto the screen. A funnel beneath the harvest chamber 120 to collect water. A primary reservoir 130 serves as a container for water that flows from the holding chamber 110 through the harvest chamber 120. A secondary reservoir 135 of clean water placed in an elevated position above the trap 100. Plastic tubes or conduits 190, 192, and 194 for air and water transport.

Referring to FIG. 1, the mosquito harvest chamber 120 has a screened round cage-like chamber 125 which is removable. This screened chamber 125 is a fine mesh that allows water to quickly pass through but retains even the smallest mosquito larvae. Water empties into the screened chamber 125 from the holding chamber 110 via water outlet 190 and valve 260. Water passes on through chamber 120 to the primary water reservoir.

The primary water reservoir 130 is a plastic bottle that receives water from the holding chamber 110. Water enters the reservoir 130 from the harvest chamber 120. The secondary water chamber 135 is a water container of variable size (depending on the size of the water body 165) for continuously maintaining the level of water in the water body 165.

The water reservoirs 130, 135 have a network of hoses consisting of a hose 194 leading from the primary water reservoir 130 that joins with the hose 192 leading from the secondary water reservoir 135 before attachment to the water inlet 180 on the holding chamber 110. Each of the two hoses 192, 194 disposed within each reservoir 130, 135, respectively, has an electronic valve 275, 280, respectively, that can be closed or opened depending on operational mode. When water is pumped from the primary reservoir 130, valve 280 from the secondary reservoir 135 is closed, and vice versa.

The water valve 275 is connected to hose 194 leading from the primary water reservoir 130 to the holding chamber 110. The water valve 280 is connected to hose 192 leading from the secondary water reservoir 135 to the holding chamber 110.

The reservoir float switch 132 is a float and electric switch on the upper side of the reservoir. Switch 132 will start an electric water pump 140 to return water from the primary reservoir 130 to the sealed holding chamber 110. The electric pump 140 is a small, low-voltage pump to recycle water from primary reservoir 130 to the holding chamber 110.

Figure 2:
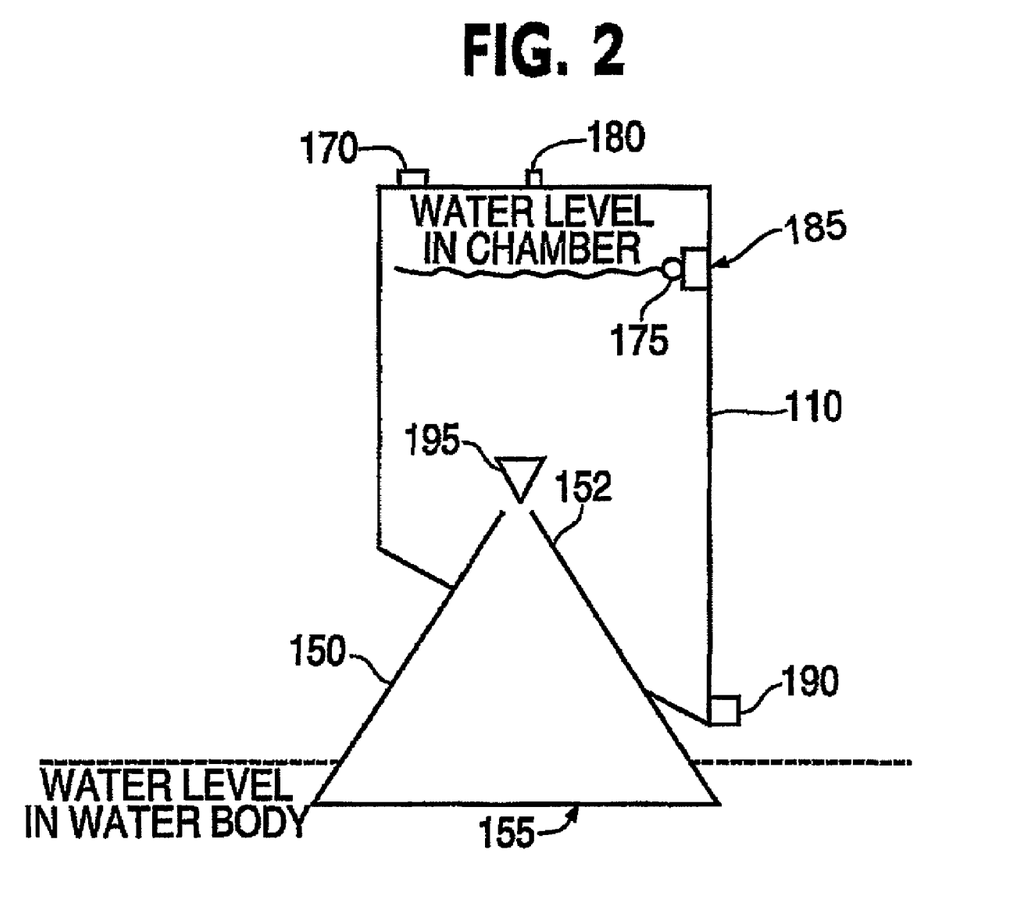
FIG. 2 is a diagrammatic representation of a side view of the holding chamber of the mosquito harvest trap of FIG. 1.

Referring to FIG. 2, the inverted funnel 150 may consist of a clear, plastic funnel. The inverted funnel 150 may be of variable sizes, depending on size and depth of the water body 165 from which mosquito larvae are collected. The constricted portion 152 of the inverted funnel 150 fits through the bottom of a holding chamber 110 and may be welded thereto. The constricted portion 152 of the funnel, located inside the holding chamber 110, is equipped with a water-tight seal 195 that may be closed or opened electronically. The wide part of the inverted funnel 150 is positioned about ½ inch below the surface of water in the water body 165. The remainder of the inverted funnel 150 is positioned above the water level. The wide part of the inverted funnel 150 that is just below the water surface is also referred to as the mouth 155 of the trap.

The holding chamber 110 consists of a round, plastic, sealed chamber in which larvae enter through the inverted funnel 150 and are trapped. The diameter of holding chamber 110 is roughly equivalent to the mouth 155 of the inverted funnel 150. The bottom of the chamber 110 is sloped from a high point on one side to a low point on the other side of the chamber. The sloped bottom encircles and is sealed around the narrower portions of the inverted funnel 150.

The water outlet 190 is an outlet from the holding chamber 110 located on the low point of the sloped bottom. The water outlet 190 is equipped with a watertight seal 260 that is opened electronically. The water inlet 180 is an inlet for water on top of the holding chamber 110 equipped with an electronic valve 265. This opening is equipped with a tube for returning water to the holding chamber 110 from the primary reservoir 130 or secondary reservoir 135. When there has been an overall loss of water, valve 265 will allow entry of water by gravity flow from a secondary elevated water reservoir 135. The air inlet 170 has an electronic valve 270 on top of the holding chamber 110. When valve 270 is open, air can move freely into or out of the holding chamber 110. The float switch 185 has a float 175 that will move with the water level in the holding chamber 110. Depending on operational mode, variations in water level will trigger programmed actions via the control unit 200.

Figure 3:
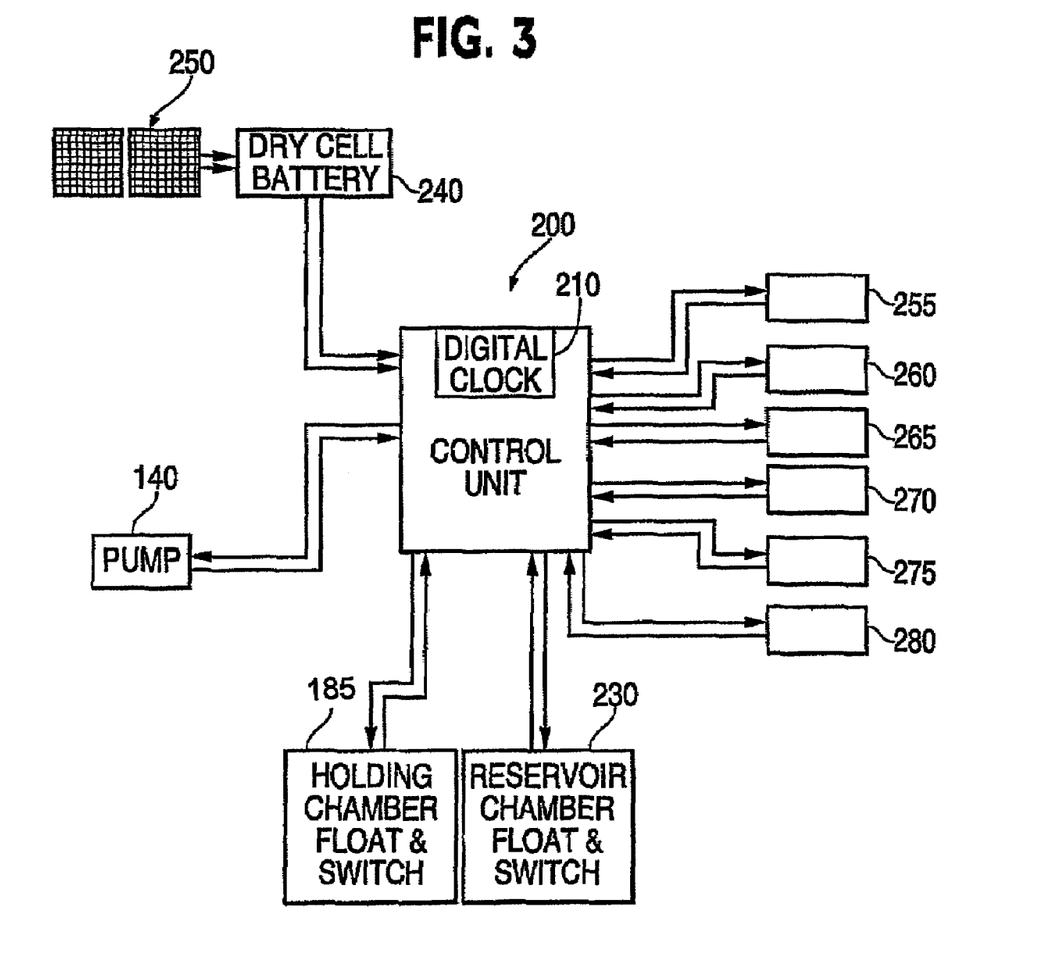
FIG. 3 is a schematic of the control unit of the mosquito harvest trap of FIG. 1.

Referring to FIG. 3, a programmable electronic control unit 200 having date and time functions uses a digital clock 210 to sequence intervals to expel the contents of holding chamber 110 and to reestablish the water column within chamber 110 by synchronizing the opening and closing of valves 195, 260, 265, 270, 275, 280 and the starting and stopping of pumps 140, 410. A rechargeable battery 240 energizes control unit 200. A solar panel 250 recharges battery 240. Electronic seals and valves that are both air and water tight. A low-voltage water pump (140) and a low-voltage air pump (410, see FIG. 7).

The electronic control unit 200 is a programmable, battery-powered unit that communicates and controls functions of all electronic valves and pumps. Control unit 200 is, by analogy, the central nervous system of trap 100. This unit is composed of low-voltage chips, electronic valves 255, 260, 265, 270, 275, and 280, pumps 140 and 410, and a rechargeable battery 240. The control unit 200 maintains a date and time schedule and also monitors battery charge and photo cells. The control unit 200 is charged by a powerful but small rechargeable dry-cell battery 240. The battery 240 may be rechargeable by energy from solar panel 250 using a panel of photocells for recharging the battery. It may also be removed and recharged through use of a charger and alternating current.

Electronic valves 255 through 280 (FIG. 3) have designated functions. Valve 255 opens and closes opening 195 of the inverted funnel. Valve 260 opens and closes the drainage tube 190 leading from the holding chamber 110. Valve 265 opens and closes water inlet 180 to the holding chamber. Valve 270 opens and closes the air inlet 170 to the holding chamber 110. Valve 275 opens and closes the water line from the primary water reservoir 230 to pump 140. Valve 280 opens and closes the water inlet 180 from the secondary water reservoir 135 to the holding chamber 110.

Control Unit 200 houses the battery 240, circuits and software for trap 100. In operation, trap 100 functions according to one of two subroutines. The primary trap operation is to harvest mosquito larvae from the holding chamber 110 at timed intervals. The primary operation is a function of subroutine "a." A secondary trap operation is to maintain water levels in the water body 165 and holding chamber 110. This secondary operation essentially works through a joint process of maintaining the water level and the water column within the holding chamber 110. The secondary operation is managed by subroutine "b." Steps for managing primary and secondary operations through the subroutines are described below.

| | Subroutine "a": A timed-sequenced program- | |
|---|---|---|
| Step | Communication Event | Action Event |
| 1 | Digital clock program sends signal to subroutine "a" | signal received by subroutine "a" |
| 2 | Subroutine "a" sends signal to close opening of inverted funnel 195 in holding chamber. Signal sent to valve 255 | Valve 255 closes opening of inverted funnel 195 |
| 3 | Valve 255 closes and sends signal to subroutine "a" | Signal received by subroutine "a" |
| 4 | Subroutine "a" sends signal to open drainage tube 190 from holding chamber and open air inlet opening 170 to holding chamber. Signals sent to valves 260 and 270 | Valve 260- opens drainage tube 190<br>Valve 270 opens air inlet 170 |
| 5 | Open valves 260 and 270 send signals to subroutine "a" | Signals received by subroutine "a" |
| 6 | As water flows from holding chamber 110 reservoir float 170 drops and float switch 220 opens and sends signal to subroutine "a" | Signal received by subroutine "a" |
| 7 | Subroutine "a" sends signal to open water inlet 180 from the primary water reservoir to the holding chamber 110. Signal sent to open valve 265. Signal also sent to confirm that water line from the secondary water reservoir is closed (confirmation signal sent to valve 280 | Valve 265 opens water inlet 180<br>Confirms that valve 280 is closed |
| 8 | Valve 265 sends signal to subroutine "a" | Signal received by subroutine "a" |
| 9 | As water flows into primary water reservoir 130, float 132 raises and closes switch 230. Switch 230 sends signal to subroutine "a." | Signal received by subroutine "a." |
| 10 | Subroutine "a" sends signal to open water line from primary water reservoir 130 back to the holding chamber 110. Signal sent both to open valve 275 and pump 140 | Valve 275 opens water line to pump 140<br>Pump 140 begins pumping water |
| 11 | Pump switch sends signal to subroutine "a" | Signal received by subroutine "a" |
| 12 | Subroutine begins a 30-second pause as water is pumped into the holding chamber to wash stranded larvae from chamber 110 into the harvest chamber 120. After the 30-second pause, a signal is sent to close drainage line 190 from the holding chamber. Signal sent to open valve 260. | Valve 260 closes drainage tube 190 |
| 13 | Valve 260 sends signal to subroutine "a" | Signal received by subroutine "a" |
| 14 | Water is pumped into holding chamber 110. Once appropriate water level is established, the holding chamber float 175 rises, closing switch 185. Closing of switch 185, initiates a signal to subroutine "a" | Signal received by subroutine "a" |
| 15 | Subroutine "a" sends signals to stop pump 140 and to close air and water inlets (170 and 180) to the holding chamber and to close the water line from the primary reservoir to the pump. Valves 265, 270, and 275 close. | Pump 140 stops; valves 265 closes water inlet 180; valve 270 closes air inlet 170; and valve 275 closes water line to pump 140. |
| 16 | Pump and valve switches send signals to subroutine "a" that pump stopped and valves are open (meaning that air and water inlets are closed) | Signals received by subroutine "a" |
| 17 | Subroutine "a" sends a signals to open inverted funnel opening of the holding chamber. Signal sent to open valve 255. | Valve 255 opens seal 195 of inverted funnel |
| 18 | Open valve 255 sends signal to subroutine "a" | Signal received by subroutine "a" |
| 19 | Subroutine "a" is reset (goes into waiting mode for the next signal from digital clock to begin with step 1 of subroutine "a") | |

Figure 4:
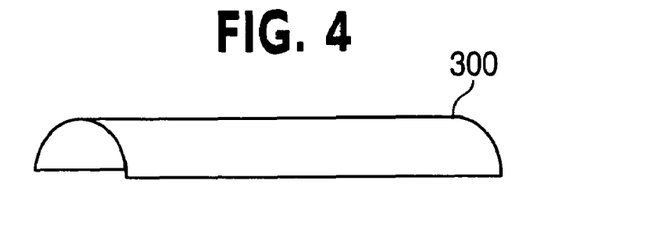
FIG. 4 is a perspective view of a collector tube of the mosquito harvest trap according to a second embodiment of the invention.
Figure 5:
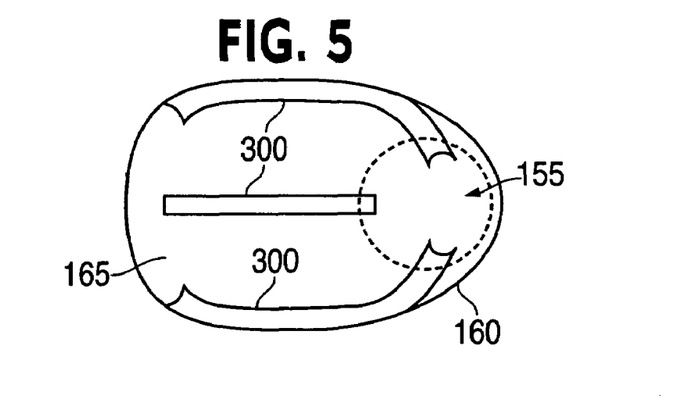
FIG. 5 is a top view of a plurality of collector tubes within the water tank of the mosquito harvest trap according to the embodiment of FIG. 4.
Figure 6:
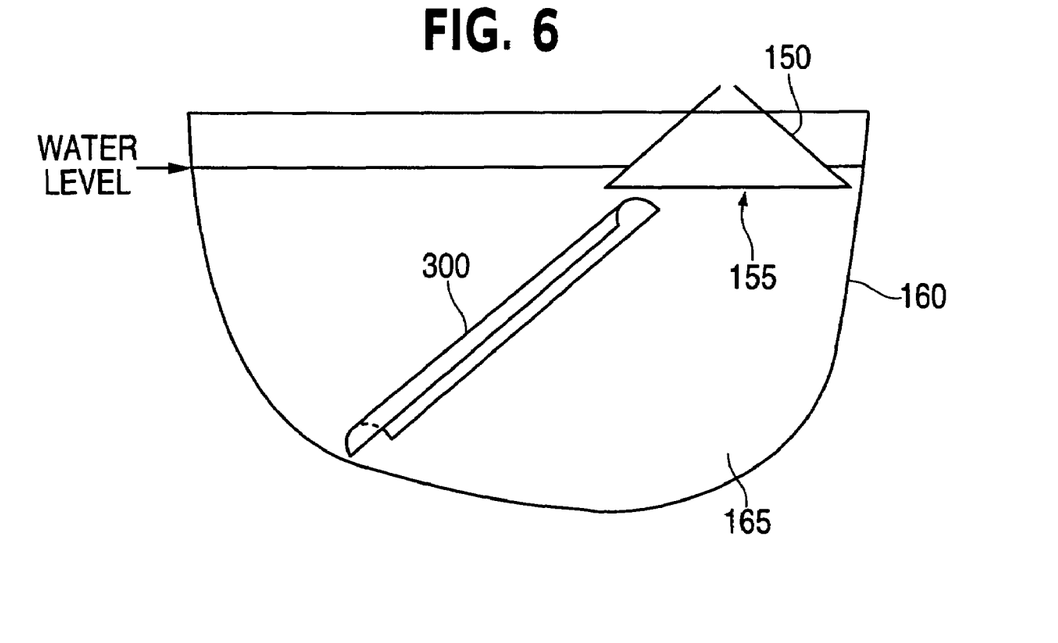
FIG. 6 is a diagrammatic view of the water tank with collector tube of the mosquito harvest trap according to the embodiment of FIG. 5.

A drop in water level within the holding chamber 110 will activate subroutine "b." This subroutine will not be activated if the drop in water level occurs within 30 minutes of a programmed time for harvesting larvae from the holding chamber 110. A drop in water level can occur due to evaporation of water from the water body 165 which will, in turn, produce a drop in water level within the holding chamber 110. When this happens, the holding chamber 110 float will drop and the float switch 185 will drop into the open position. The open float switch 185 will initiate the following sequence of communications and actions.

body 165. The length of collector 300 may vary with size and depth of water. The channel collector 300 may angle from the bottom of the water tank, beginning at a point most distant from the holding chamber 110, and angle up diagonally to a point just barely beneath mouth 155. A transparent plastic skeleton of supports (not shown) may be used to hold collector 300 in fixed positions. Multiple collectors 300 may be positioned within a single water body 165.

Another type of collector is a funnel collector, which is a larger inverted funnel (not shown) located below mouth 155. A funnel collector is most appropriate for a round water body

| | Subroutine "b": An untimed-sequenced program- | |
|---|---|---|
| Step | Communication Event | Action Event |
| 1 | Holding chamber 110 float 175 drops and triggers open float switch 220, sending signal to subroutine "b" | signal received by subroutine "b" |
| 2 | Subroutine "b" sends signal to close opening of the funnel leading into the holding chamber. Signal sent to close valve 255. | Valve 255 closes opening 195 of inverted funnel |
| 3 | Closed valve 255 sends signal to subroutine "b" | Signal received by subroutine "b" |
| 4 | Subroutine "b" sends signal to open air inlet 170 and water inlet 180, and to open water line 145 from the secondary reservoir 135. These actions accomplished by sending signals to valves 265, 270, and 280 . . . | Valves 265, 270, and 280 open water inlet 180, air inlet 170, and water tube 145 from reservoir 135. |
| 5 | Open valves 265, 270, and 280 send signals to subroutine "b" | Signals received by subroutine "b" |
| 6 | Through gravity flow, water enters the holding chamber 110 from the secondary water reservoir. Water level is re-established, and the holding chamber 110 float switch 175 rises and float switch 220 closes, sending a signal to subroutine "b" | Signal received by subroutine "b" |
| 7 | Subroutine "b" sends signal to valves 265, 270, and 280 | Valves 265, 270, and 280 close water inlet 180, air inlet 170, and tube 145. |
| 8 | Valves 265, 270, and 280 sends signal to subroutine "b" | Signal received by subroutine "b" |
| 9 | Subroutine "b" sends signal to open the funnel leading to the holding chamber. Signal sent to valve 255. | Valve 255 opens the inverted funnel to the holding chamber. |
| 10 | Valve 255 sends signal to subroutine "b" | Signal received by subroutine "b" |
| 11 | Subroutine "b" resets program to wait for signal from float switch 220. Signal will be sent by float switch 220 if float 175 drops in response to a drop in water level within the holding chamber. | |

Referring to FIGS. 4-6, the device may also include a system of plastic baffles or collectors 300 within the water body 165 for directing larval movement. Collectors 300 may be a half-round piece of clear plastic of two to three inches diameter and of variable lengths. For example, in round water bodies, an individual collector 300 might also be in the form of a second, larger inverted funnel 150 that operates in the space below the inverted funnel 150 of the trap 100. In either case, collectors 300 are designed to intercept larvae from outer regions of the water body 165 and to direct movements of larvae toward the mouth of the trap 100.

Referring to FIGS. 4-6, there are two types of collectors 300 that can be used in the water body 165. One type of collector is a channel collector 300, which is a long, half-round, clear plastic channel that is open on both ends and on the half side. The channel collectors 300 are placed with the half-round opening facing toward the bottom of the water

165. It functions as a second inverted funnel 150 located below the trap 100 and it intercepts larvae near the bottom at peripheral areas of the water body 165. The constricted portion 152 of the funnel collector may be slightly narrower than mouth 155 and may be centered below mouth 155. Larvae that swim under the outer rim of the funnel will be forced to swim upward within the funnel to a position just beneath mouth 155.

Figure 7:
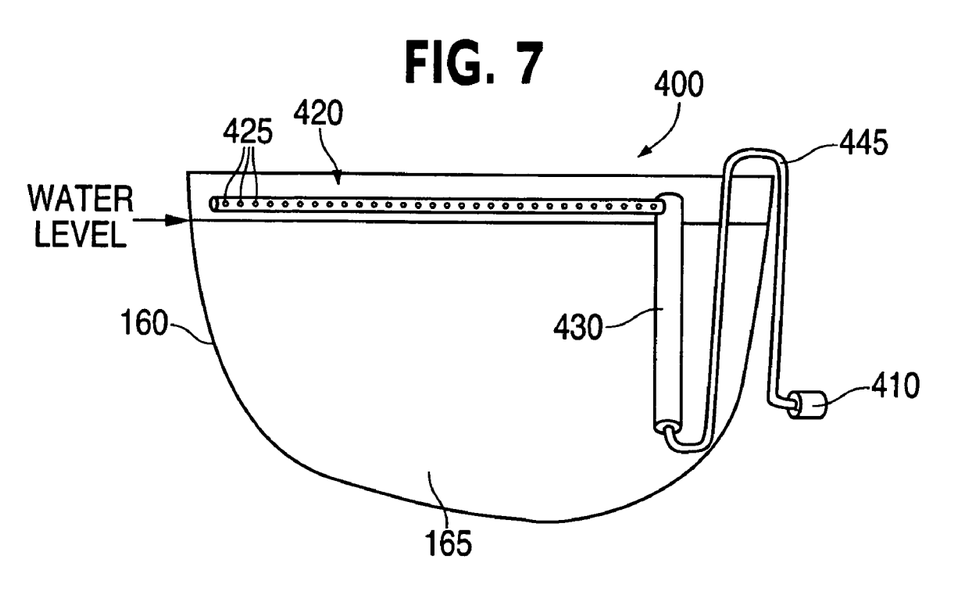
FIG. 7 is a diagrammatic view of the attractant air tube assembly within the water tank of the mosquito harvest trap according to a third embodiment of the invention.
Figure 8:
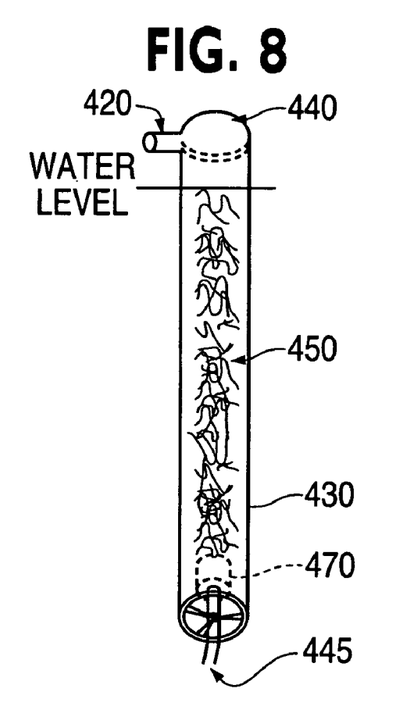
FIG. 8 is a diagrammatic view of the attractant air tube of the mosquito harvest trap according to the embodiment of FIG. 7.
Figure 9:
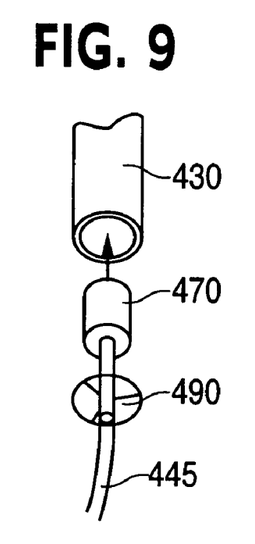
FIG. 9 is a partial exploded view of the attractant air tube subassembly of the mosquito harvest trap according to the embodiment of FIG. 7.

Referring to FIGS. 7-9, a mosquito attractant assembly 400 for intermittent pumping of air through material 450 that will attract gravid female mosquitoes to the water body 165. The water body 165 consists of a plastic open water tank 160. The tank 160 may be of various sizes and depths. The water body 165 serves as the attractant and an egg-laying site for gravid mosquitoes. Trap 100 components can be attached to one end of a rectangular or oval water tank 160 or may be located in the center of a round water tank 160.

Referring to FIGS. 7-9, a mosquito attractant assembly 400 functions by forcing the fine bubbles of air up a narrow, vertical column of water containing different types of mosquito attractant materials 450. This assembly 400 consists of a vertical plastic tube 430 for containing a column of water within the water body 165. The tube 430 is sealed at the bottom end with fine mesh screen 490. The mesh screening 490 at the bottom of the tube 430 is designed to prevent small mosquito larvae from entering the vertical tube 430 from beneath. An air tube 445 is attached to an air pump 410 that passes through the center of the mesh screen 490 at the bottom of the vertical tube 430. A fine air stone 470 is located at the end of the air tube 445 within the vertical plastic tube 430. The vertical plastic tube 430 is sealed with a screw cap 440 above the water surface and has a network of plastic tubules 420. The plastic tubules 420 leading from the vertical tube are located in the water body 165. Tubules 420 distribute a diffuse flow of air laden with mosquito attractant chemicals. The tubules 420 are located just above the water surface and are populated with tiny pores 425 through which attractant laden air escapes. The mosquito attractant assembly 400 also consists of a small, low-voltage air pump 410. Air pump 410 can be programmed to function only during hours when a specific mosquito species is searching for a place to lay eggs. For a given mosquito species, the time of laying eggs is often restricted to a 2-3 hour period each day or night. In other words, air pump 410 would function at low capacity for only 2-3 hours each day.

The overall function of the mosquito harvester trap 100 is to provide an optimal body of water that will competitively attract gravid mosquitoes to lay their eggs. Components are included to greatly enhance attraction of the water body 165. For some mosquitoes, eggs, on the water surface actually emit attractant for other mosquitoes to come to the water and lay their eggs.

Eggs will be deposited on the surface or on sides of the water body 165. Once eggs hatch, the trap will mechanically harvest and destroy the larvae. No toxic chemicals will be used in this trapping device. The trap 100 is designed to work continuously and will, even under very rainy conditions, draw down progeny populations of targeted mosquitoes.

In operation, the trap makes use of natural behaviors of mosquito larvae to trap and destroy them. The trap functions through use of an unbroken column of water that extends above the surface of a water body 165. The height of the water column includes the inverted funnel 150 and height of a holding chamber 110 above the funnel. In fact, the column of water can be several inches or a foot or more above the water surface. The water column is maintained in the holding chamber 110 much as a water column is formed by a water fountain with bottled water. In other words, a water column is maintained by displacement of air with water, and water flows out only when air enters the bottle, and displaces the water.

The water column within the trap extends above the water surface because the mouth is placed below the water surface. In this position air cannot enter the inverted funnel 150 or holding chamber 110. Since the inverted funnel 150 and holding chamber 110 are airtight, a water column is formed.

By placing the inverted funnel 150 opening close to the water surface, the inverted funnel 150 efficiently gathers larvae from a large area of the water body 165. The reach of the inverted funnel 150 is increased even more by use of collector 300. Again, because the trap funnel is close to the surface, the collector 300 can radiate diagonally down through the many areas of the water body 165. Once larvae are within the confines of a channel or funnel collector 300, they will eventually move upward to an area directly below mouth 155 of the trap 100.

As larvae continue their upward movement they enter the wide mouth of the inverted funnel 150. They then migrate up through the constricted opening of the funnel into the holding chamber 110. Once they enter the holding chamber 110 they are trapped.

In operation, the control unit 200 is on a programmed schedule of every 6, 12, 24, 48, or 72 hours, contents of the holding chamber 110 are evacuated and the larvae are destroyed. Eliminating the larvae requires a sequence of programmed actions to maintain the water column while emptying the contents of the holding chamber 110. As the holding chamber 110 is emptied, larvae flow out of the holding chamber 110 into the harvest chamber 120. The harvest chamber 120 separates the larvae from the water. Without water, the larvae quickly die. The outflow of water, now free of larvae, is returned to the holding chamber 110 and the full unbroken water column is re-established. At a preset time, programmed actions occur in the following sequence: 1) valve 255 closes; 2) valves 260 and 270 open; 3) water flows out of the holding chamber 110 through valve 260 and air flows in through valve 270; 4) water passes through the sieve of the harvest chamber 120; 5) water begins to fill the water reservoir 130 after passing through the harvest chamber 120; 6) As the reservoir becomes full, a float in the reservoir triggers valves 265 and 275 to open and valve 280 to close; 7) simultaneously pump 140 begins to move water from reservoir 130 back into the holding chamber 110; 8) briefly, valve 260 remains open so that water flowing into the holding chamber 110 can wash any stranded larvae out of chamber 110; 9) valve 260 closes and the holding chamber 110 refills with water from the primary reservoir 130 (recycled water); 10) once the holding chamber 110 is full, a float 175 is raised in holding chamber 110, triggering float switch 220 to open; 11) opening switch 220 stops pump 140 and causes valves 265, 270, and 275 to close; and 12) once valves 265, 270, and 275 are shut, valve 255 opens the funnel 150 to the holding chamber 110 and the unbroken water column is re-established.

In a full version of the trap, procedures are designed to recycle water and prevent significant water loss. However, water loss may occur and water volume may need to be replaced through continuous and orderly trap operations.

The primary cause of water loss is through evaporation from the surface of the water body 165. Surface evaporation will eventually drop water level below the inverted funnel 150. When that happens, air will enter the mouth of the inverted funnel 150 and pass into the holding chamber 110. As air enters, water will flow out of holding chamber 110 and pass down through the funnel into the water body 165. This action can be characterized as a "burp" that automatically maintains the volume of water in the water body 165.

The problematical part of this "burp" is loss of water in the trap. The "burp" will initiate a chain of programmed events. Water displacement by air will cause the float 175 in the upper part of the holding chamber 110 to trigger specific actions. The sequence of actions will occur as a default program separate from programmed actions for harvesting mosquito larvae. After water flows out of the holding chamber 110 the float 175 will drop. The drop in the float level will trigger float switch 220 to close the funnel opening at 195. This is achieved by closing valve 255. Subroutine "b" will also perform a check to determine that valve 275 is closed. Once valve 255 is closed, valves 265, 270, and 280 will be opened. Water will flow through valve 3 from the secondary water reservoir 135 into the holding chamber 110. This flow will continue until the water level in the holding chamber 110 is full. Once the holding chamber 110 is full, float switch 220 in the holding chamber 110 will close. Subroutine "b" will then close valves 280, 265, and 270. Valve 255 will then reopen the funnel opening at 195 in the holding chamber 110. Once valve 255 is open, the full water column will be re-established.

An alternative approach to maintaining water level is to place a float (not shown) in the water body 165 and have water flow directly from the secondary reservoir 135 into the water body 165. This configuration might be useful for harvesting progeny of mosquitoes that lay eggs on the walls of the water tank 160 above the water surface. If such a mosquito is targeted for control, it may be desirable to suspend trap functions for intervals of 2-3 days and allow water evaporation to occur and water level to drop in the water tank 160. As water level drops, eggs will be deposited on the wall of the water tank 160 just above the receding water level. At the end of the programmed suspension period the trap is then automatically re-activated and a functional water level is re-established within the water tank 160 and within the trap's holding chamber 110. When water is added, eggs on the wall of water tank 160 will be submerged and the eggs will hatch. The trap will then function continuously for 2-3 days to harvest the new generation of mosquito larvae. A continuous repetition of this cycle of suspending trap functions, then re-activating trap functions will serve to control mosquitoes that lay eggs on walls of water tank 100. This repetitive cycle will also allow the trap 100 to continue harvesting mosquitoes that lay eggs on the water surface. Thus, the software that controls trap functions can be flexible and allow repetitive cycles of activating the trap 100 and of suspending trap functions for variable periods of time.

The mosquito harvest trap 100 combines natural behaviors of mosquito larvae and modern technologies to provide a continuous operation of harvesting mosquito larvae as soon as they hatch from eggs. Basic trap 100 functions can be tailored to various types of water bodies. For example, the water column technology may be used as an integral component of a bird bath. Such a trap may function as a water column in the center of the bird bath. As such, it would be a stand alone trap—collecting larvae and recycling water. Alternatively, with automatic water input from a household water supply, the larvae along with water from the holding chamber could be dumped on the ground. The larvae would die once they are dumped on the ground. The same technology may be used in a self-contained device that floats in a fish pond, continuously collecting and destroying mosquito larvae in the pond. Likewise, the technology may be used in a trap that simulates a tree hole. LaCrosse virus which is a growing public heath threat in the eastern United States is transmitted by mosquitoes that commonly lay eggs in tree holes. A tree-hole mimic trap using water column technology can be an additional approach to controlling mosquitoes involved in LaCrosse Virus transmission. Again, the water column technology would be equally applicable to each of these trapping devices.

Various configurations of trap 100 components can be employed. A simple version would have minimal energy requirements, be self-contained, would not include an attractant assembly 400, would dump larvae and water from the holding chamber 110 on the ground, and water would not be recycled into the holding chamber 110. A simple version could function as part of a bird bath. A full version would be self-contained and include all the components described above. A full version could also function as an integral part of a bird bath, simultaneously harvesting mosquitoes and maintaining water level within the bird bath. A version of this trap 100 could even function as a self-contained floating device within a natural or man-made pond. The objective of such a floating trap would be to harvest mosquito larvae present within the pond. A floating trap could even be motorized and with a remote control unit, moved from one area of the pond to another.

Dry weather periods create critical conditions for gravid mosquitoes. When other bodies of water are dry, the trap may continue to offer an optimal egg-laying site and may continue to harvest mosquitoes. A continuously operating trap during dry weather will even more seriously deplete progeny populations.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A trap for harvesting mosquito larvae, comprising:
a water tank;
a sealed holding chamber;
a harvest chamber; and
a control unit,
wherein said water tank is disposed beneath said holding chamber and said control unit is configured to expel and to reestablish a predetermined level of water within the holding chamber;
wherein said holding chamber comprises a float switch for signaling drops in water levels, a mouth opening having a sealing valve, an air portal valve, a water inlet valve and a water outlet; and
wherein said mouth opening comprises an inverted funnel and is in fluid communication with water held within the water tank.

2. The trap of claim 1, wherein said control unit is powered by a rechargeable solar battery.

3. The trap of claim 1, wherein said control unit controls a plurality of flow valves in communication with said holding chamber and at least one water reservoir.

4. The trap of claim 3, wherein said control unit is configured to communicate with said float switch which is disposed within the holding chamber, wherein said float switch determines the water level within said holding chamber.

5. The trap of claim 1, wherein the control unit operates a pump in communication with at least one reservoir and said water inlet valve of the holding chamber.

6. The trap of claim 5, wherein the at least one reservoir has a control valve in communication with the control unit.

7. The trap of claim 1, wherein said float switch, said sealing valve, said air portal valve, said water inlet valve and said water outlet valve are in communication with said control unit.

8. The trap of claim 1, wherein the water tank further comprises at least one collector tube for directing mosquito larvae to the holding chamber.

9. The trap of claim 8, wherein the at least one collector tube is concave downward.

10. The trap of claim 1, wherein the water tank further comprises an attractant tube assembly for attracting mosquitoes.

11. The trap of claim 10, wherein said attractant tube assembly comprises an air tube filled with attractant material, an air pump disposed at a first end of the air tube and a perforated release tube for releasing attractant laden air disposed at a second end of the air tube.

12. The trap of claim 1, wherein said control unit is electrically powered.

13. The trap of claim 1, wherein said control unit is a digitally programmable device.

* * * * *